United States Patent [19]

Clausen

[11] Patent Number: 4,694,898
[45] Date of Patent: Sep. 22, 1987

[54] HEAT EXCHANGER ELEMENT COMPRISING A SINGLE AND INTEGRALLY EXTRUDED MEMBER INCLUDING AT LEAST TWO HOLLOW TUBES INTEGRALLY JOINED BY AT LEAST TWO WEBS

[75] Inventor: Edvin L. Clausen, Tonder, Denmark

[73] Assignee: Norsk Hydro a.s., Oslo, Norway

[21] Appl. No.: 783,636

[22] Filed: Oct. 3, 1985

[30] Foreign Application Priority Data

Oct. 17, 1984 [NO] Norway ................................. 844137

[51] Int. Cl.$^4$ .............................................. F28F 1/42
[52] U.S. Cl. .................................. 165/171; 165/172; 165/179; 165/183
[58] Field of Search ................ 165/171, 179, 172, 183

[56] References Cited

U.S. PATENT DOCUMENTS

| 333,119 | 12/1885 | Ephraim | 165/171 X |
|---|---|---|---|
| 1,125,113 | 1/1915 | Junkers | 165/171 |
| 1,595,563 | 8/1926 | Murray | 165/171 |
| 2,286,271 | 6/1942 | Higham | 165/172 X |
| 2,294,030 | 8/1942 | Higham et al. | 165/172 X |
| 2,294,137 | 8/1942 | Spofford | 165/179 X |
| 2,577,120 | 12/1951 | Franz | 165/171 X |
| 2,804,284 | 8/1957 | Otten | 165/171 X |
| 3,273,637 | 9/1966 | Pauls | 165/171 |
| 3,366,170 | 1/1968 | Welz | 165/171 X |
| 3,380,518 | 4/1968 | Canteloube et al. | 165/171 |
| 3,648,768 | 3/1972 | Schöll | 165/171 |
| 4,114,598 | 9/1978 | Leeuwen | 165/171 X |
| 4,131,110 | 12/1978 | Jones, Jr. | 165/171 X |

FOREIGN PATENT DOCUMENTS

| 200172 | 4/1958 | Austria | 165/171 |
|---|---|---|---|
| 496027 | 9/1953 | Canada | 165/171 |
| 1008331 | 5/1957 | Fed. Rep. of Germany | 165/179 |
| 276719 | 4/1903 | France | 165/179 |
| 1186583 | 11/1957 | France | 165/171 |
| 416493 | 11/1946 | Italy | 165/179 |
| 540257 | 3/1956 | Italy | 165/179 |
| 572170 | 10/1956 | Italy | 165/171 |
| 175590 | 3/1935 | Switzerland | 165/179 |

OTHER PUBLICATIONS

Reexamination certificate B1 3,648,768; Schöll, Gunter; 10/18/1983.

Primary Examiner—William R. Cline
Assistant Examiner—Randolph A. Smith
Attorney, Agent, or Firm—Wenderoth, Lind & Ponack

[57] ABSTRACT

A heat exchanger element includes a single and integrally extruded member having at least two hollow tubes having parallel longitudinal axes, each two adjacent hollow tubes being connected by at least two webs which extend parallel to the longitudinal axes and which are formed integrally with each of the two adjacent hollow tubes. The webs have therethrough plural perforations, and the material of each web between adjacent perforations therein is deflected to form a rib extending at an angle to the web. At least one tube has formed integrally therewith a projecting track which extends parallel to the longitudinal axes. Plural heat exchanger elements are connected at the respective tracks thereof to form a tube bundle.

19 Claims, 7 Drawing Figures

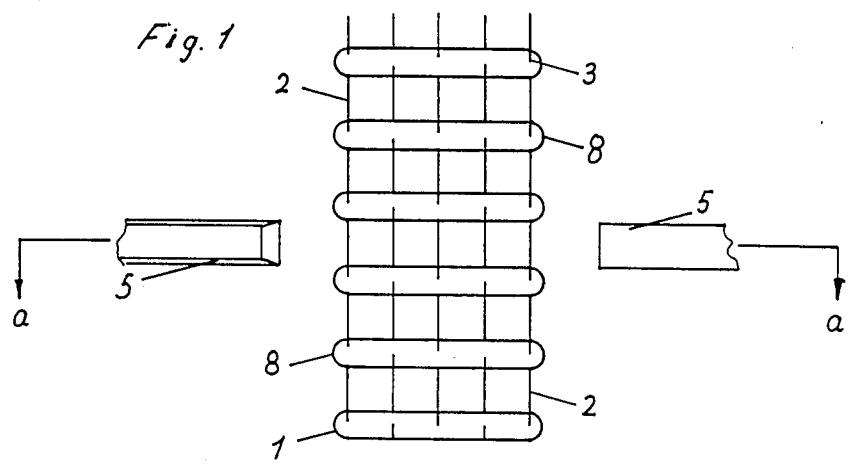
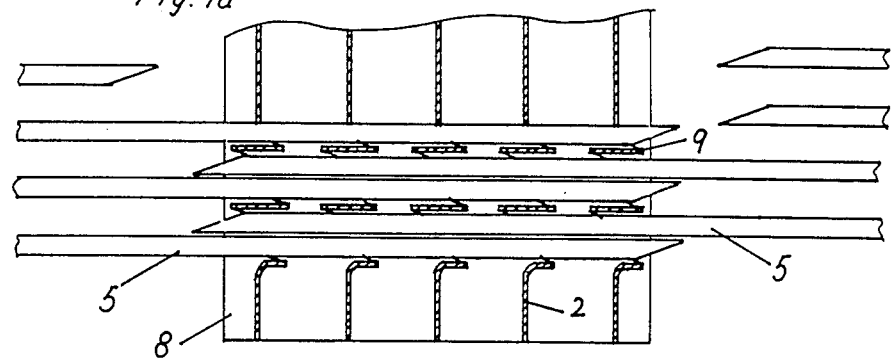
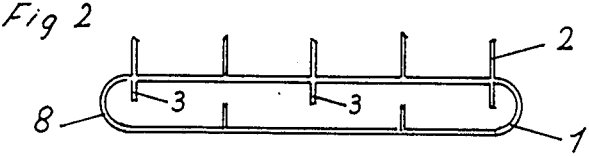

HEAT EXCHANGER ELEMENT COMPRISING A SINGLE AND INTEGRALLY EXTRUDED MEMBER INCLUDING AT LEAST TWO HOLLOW TUBES INTEGRALLY JOINED BY AT LEAST TWO WEBS

BACKGROUND OF THE INVENTION

The invention relates to heat exchanger elements and more particularly to hollow shapes for heat exchangers, a tube bundle comprising one or more hollow shapes and a procedure for manufacturing such hollow shapes and tube bundle. The specially designed hollow shapes are integrally extruded and each comprises a number of tubes and a plurality of thin interconnecting webs or lamellae between and connecting the adjacent tubes.

Heat exchangers comprising a plurality of parallel tubes projecting into headers and forming a heat exchanger unit (element) are at present mainly made of aluminum or copper tubes with interjacent lamellae which are mutually connected in order to establish a heat-conducting connection.

The connection between tubes and lamellae can be obtained by soldering/brazing or welding, and to facilitate this operation the tubes or lamellae are plated with, e.g., AlSi alloy which during a subsequent heating of the assembled heat exchanger melts, thereby ensuring a reliable, firm connection.

In the case of heat exchangers which are made up of flat or flat oval tubes, brazing or soldering has until now been the only possible connection method. When using tubes with a circular cross-section, a simplified connection method has been established. Here the heat exchanger is assembled using specially formed top and bottom headers, after which the tubes are given a permanent deformation mechanically or under pressure, by expansion against the limiting lamella sides.

Such an assembly method is however not possible in the case of flat, oval tubes, as these cannot maintain the contact pressure against the lamellae over the entire circumference.

Soldering or brazing of the individual tubes is however a highly labour-intensive and cost-adding operation, and although using expansion of the individual tubes does not result in a connection of the same quality and strength, something which reduces the efficiency of the heat exchanger, it is nevertheless this later method which is presently primarily used in the manufacture of heat exchangers.

SUMMARY OF THE INVENTION

The object of the invention is to provide tube and lamella (fin stock) connections which are always reliable and firm without using plated tubes and lamellae with a subsequent soldering/brazing operation.

It is further the object of the invention to produce such connections which are equally effective, regardless of whether the tubes are of flat, oval, elliptic or round cross-section.

Another object of the invention is to manufacture hollow shapes with such tube and lamella connections, where the hollow shapes can easily be joined together to form larger units.

Finally it is the object of the invention to provide a method for the manufacture of hollow shapes with specially formed integrated webs resulting in an optimal heat-conductive surface.

BRIEF DESCRIPTION OF THE DRAWINGS

The invention will be described more explicitly with reference to a preferred embodiment which is shown in the accompanying drawings, where FIG. 1 is a schematic sectional view through a heat-exchanger shape according to the invention and which is subjected to a perforation operation;

FIG. 1a is a sectional view through line a—a of FIG. 1;

FIG. 2 is an enlarged sectional view of a portion of FIG. 1;

DETAILED DESCRIPTION OF THE INVENTION

Figure 3:
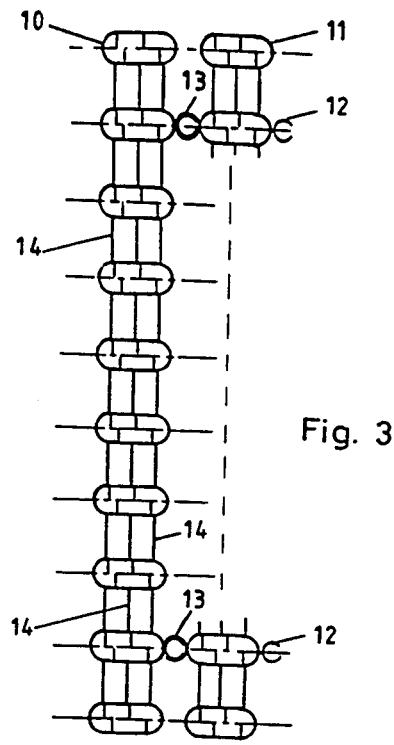
FIG. 3 is a schematic sectional view showing the principle for joining a number of shapes to form a tube bundle, composed of flat single tubes.

The hollow shapes shown in FIG. 1 comprise a number of flat tubes 1 which are mutually joined by thin lamellae or webs 2. A single tube 1 and connecting webs 2 are shown on an enlarged scale in FIG. 2. The individual flat tubes 1 can have a number of inner fins or small ribs 3 to increase the internal heat-transfer surface. As stated above, a number of thin webs 2 connect adjacent tubes with each other.

The tubes and webs have been extruded in one piece and the wall thickness of the hollow shape has been adjusted according to the pressure at which the heat exchanger is to operate.

The narrow ends or edges of the tubes of the heat exchanger element will be positioned in the direction of air circulation, and in order to obtain an optimal heat exchange between the media, e.g. air over the webs and water through the tubes, efforts must be made to alter the shape of the webs in such a way that optimal distribution with maximum turbulence is achieved for the air which is to pass between the tubes.

After extrusion the webs 2 are therefore mechanically perforated or slit and at the same time deflected so that transverse single lamellae or ribs 9 are formed, which ribs 9 extend transverse or across the original webs 2. In this way the transversally disposed lamellae 9 will maintain full metallic contact with the webs 2, and also the perforated openings in the webs allows transverse air flow between the tubes. This completely avoids the necessity of soldering, brazing, expansion etc., and there will be no reduction in the efficiency as has been experienced after a certain amount of time with conventionally connected fin stock types as a result of corrosion, vibration and the like. Perforation and deformation of the webs 2 can be obtained advantageously using a simple cutting or punching tool 5. This can be effected from one side or from both sides, and the degree of deformation or deflection can be varied in the same way as the size of the perforation can be varied depending of the shape of the tool which is used.

FIG. 1 suggests an arrangement for perforating and deflecting using a single cutting device 5 which can operate from one side or double cutting device 5, 5 which operates from both sides. FIG. 1a shows a section taken along the line a—a in FIG. 1 and illustrates a possible embodiment of the perforation pattern. The shape of the transverse lamellae 9 formed when the punching tool is pressed through the web walls can therefore be varied practically just as desired, since, as mentioned above, perforation can be done from one side or from both sides, and the transverse or vertical spacing between perforations can be varied.

With this special manufacturing method for hollow shapes, it is possible to select flat and oval tube cross-sections with optimal heat-transfer characteristics. This in turn makes it possible to build compact heat exchangers. It is assumed, however, that in some cases it is necessary to build larger heat exchangers with tube bundles which comprise a number of elements (hollow shapes) according to the invention.

Figures 4, 4A:
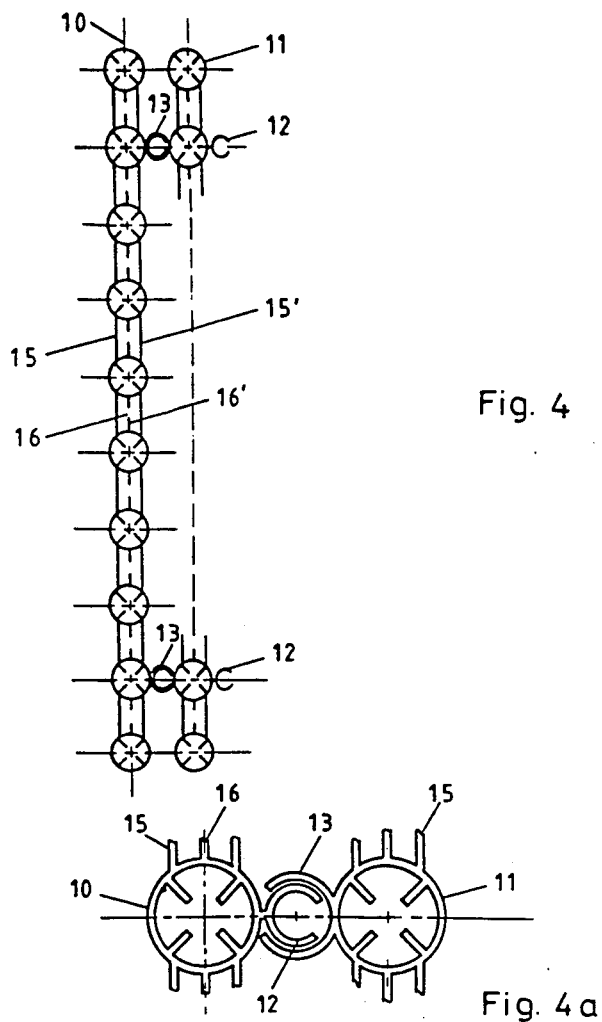
FIGS. 4 and 4a are views similar to FIGS. 3 and 3a, but showing the joining of hollow shapes formed of circular tubes.

FIGS. 3 and 4 show how this is done in practice. Individual hollow shapes 10 and 11 are extruded with respective connecting elements, e.g. tenon and mortise parts 12 and 13, of an advantageous form. Each hollow shape is formed with three parallel connecting webs 14.

Figure 3A:
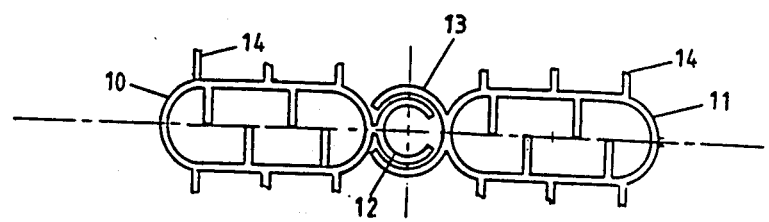
FIG. 3a is an enlarged sectional view of a portion of FIG. 3.

FIGS. 3 and 3a show shows a hollow shape comprising flat tubes according to the embodiment in FIG. 1. The next to outermost tube in each hollow shape 10 is extruded with an integral semicircular hollow key or tenon 12 which is designed to fit into a correspondingly formed hollow key or mortise 13 in an adjacent shape 11. FIG. 3 shows two hollow shapes in their joined state and the joining can of course be continued to produce a tube bundle of the desired size and form.

FIGS. 4 and 4a show a corresponding joining principle used on hollow shapes where the individual tubes are circular and formed with only two interjacent, unbroken webs 15 and 15' and a middle lamella which is formed as a bisected rib 16 and 16'.

The number of webs and tubes, their shape as well as the means used for joining can, however, be varied in other ways within the scope of the invention as defined in the patent claims, e.g. the webs could run in a zig-zag pattern between the adjacent tubes and not mutually parallel as illustrated in the accompanying drawings.

What is claimed is:

1. A heat exchanger element for use in forming a heat exchanger unit, said element comprising a single and integrally extruded member including:
   at least two hollow tubes having parallel longitudinal axes; and
   each two adjacent said hollow tubes being connected by at least two webs which extend parallel to said longitudinal axes and which are formed integrally with each of said two adjacent hollow tubes.

2. An element as claimed in claim 1, wherein said hollow tubes have circular cross sections.

3. An element as claimed in claim 1, wherein said hollow tubes have oval cross sections.

4. An element as claimed in claim 1, wherein said hollow tubes have elliptical cross sections.

5. An element as claimed in claim 1, wherein said hollow tubes have flat oval cross sections.

6. An element as claimed in claim 1, wherein at least one said tube has formed integrally therewith a projecting track means, which extends parallel to said longitudinal axes, for enabling joining of said element with another, similar said element to thereby form a tube bundle.

7. An element as claimed in claim 1, wherein said webs have therethrough plural perforations, and the material of each said web between adjacent said perforations therein is deflected to form a rib extending at an angle to said web.

8. An element as claimed in claim 7, wherein said ribs extend from opposite sides of each said web.

9. An element as claimed in claim 7, wherein said rib extends transverse to said web.

10. A tube bundle for use in forming a heat exchanger unit, said tube bundle comprising:
    a plurality of heat exchanger elements;
    each said heat exchanger element comprising a single and integrally extruded member including at least two hollow tubes having parallel longitudinal axes, each two adjacent said hollow tubes being connected by at least two webs which extend parallel to said longitudinal axes and which are formed integrally with each of said two adjacent hollow tubes; and
    means for joining said plurality of heat exchanger elements with said longitudinal axes thereof extending parallel.

11. A tube bundle as claimed in claim 10, wherein said hollow tubes of at least one said element have circular cross sections.

12. A tube bundle as claimed in claim 10, wherein said hollow tubes of at least one said element have oval cross sections.

13. A tube bundle as claimed in claim 10, wherein said hollow tubes of at least one said element have elliptical cross sections.

14. A tube bundle as claimed in claim 10, wherein said hollow tubes of at least one said element have flat oval cross sections.

15. A tube bundle as claimed in claim 10, wherein said webs have therethrough plural perforations, and the material of each said web between adjacent said perforations therein is deflected to form a rib extending at an angle to said web.

16. A tube bundle as claimed in claim 15, wherein said ribs extend from opposite sides of each said web.

17. A tube bundle as claimed in claim 15, wherein said rib extends transverse to said web.

18. A tube bundle as claimed in claim 10, wherein said joining means comprises a track member projecting from at least one said tube of each said element, each said track member being formed integrally with the respective said at least one tube and extending parallel to said longitudinal axis thereof.

19. A tube bundle as claimed in claim 18, wherein said track members of adjacent said elements have complementary configurations.

* * * * *